(12) United States Patent
Bar-on (10) Patent No.: US 11,604,783 B2
(45) Date of Patent: Mar. 14, 2023

(54) SYSTEM HAVING A CONTENT CONSISTENCY SERVICE FOR A COLLABORATION TOOL

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 274 days.

(21) Appl. No.: 16/717,417

(22) Filed: Dec. 17, 2019

(65) Prior Publication Data

US 2021/0097055 A1 Apr. 1, 2021

Related U.S. Application Data

(60) Provisional application No. 62/907,616, filed on Sep. 28, 2019.

(51) Int. Cl.
*G06F 16/23* (2019.01)
*G06F 3/14* (2006.01)
*G06Q 10/10* (2012.01)

(52) U.S. Cl.
CPC ............ *G06F 16/2365* (2019.01); *G06F 3/14* (2013.01); *G06Q 10/10* (2013.01)

(58) Field of Classification Search
CPC ........ G06F 16/2365; G06F 3/14; G06F 3/147; G06Q 10/10
USPC .......................................................... 707/691
See application file for complete search history.

(56) References Cited

U.S. PATENT DOCUMENTS

| | | | |
|---|---|---|---|
| 9,779,092 B2 * | 10/2017 | Daniels | G06F 16/94 |
| 10,649,676 B1 * | 5/2020 | De Smet | G06F 3/0608 |
| 11,243,916 B2 * | 2/2022 | Leonov | G06Q 10/101 |
| 2007/0208751 A1 * | 9/2007 | Cowan | G06Q 30/02 |
| 2019/0361900 A1 * | 11/2019 | Rogynskyy | G06F 16/235 |
| 2020/0272606 A1 * | 8/2020 | Leonov | G06F 40/30 |

* cited by examiner

*Primary Examiner* — Sheree N Brown
(74) *Attorney, Agent, or Firm* — Brownstein Hyatt Farber Schreck, LLP (57) ABSTRACT

A collaboration tool includes a content consistency service that monitors a content database of the collaboration tool for substantially similar and/or duplicate data items that reference substantially static information, such as telephone numbers, addresses, and the like. In response to such a determination, the content consistency service replaces all occurrences of duplicate/similar data items with references to a single main reference database.

20 Claims, 6 Drawing Sheets

SYSTEM HAVING A CONTENT CONSISTENCY SERVICE FOR A COLLABORATION TOOL

CROSS-REFERENCE TO RELATED APPLICATION

This application is a nonprovisional patent application of and claims the benefit under 35 U.S.C. 119(e) of U.S. Provisional Patent Application No. 62/907,616, filed Sep. 28, 2019 and titled "System having a Content Consistency Service for a Collaboration Tool," the disclosure of which is hereby incorporated herein by reference in its entirety.

TECHNICAL FIELD

Embodiments described herein relate to collaboration tools and, in particular, to systems and methods for actively monitoring, and maintaining consistency of, immutable data stored by a collaboration tool.

BACKGROUND

An organization can leverage a collaboration tool that is accessible by many individuals to facilitate completion of work related to a common goal. In many cases, however, different portions of a collaboration tool (e.g., different projects, pages, tools, and the like) may be configured to display similar or identical data, such as an individual's name or an organization's physical address that, over time, may become stale and may only be updated in some, but not all, relevant locations of the collaboration tool.

SUMMARY

Certain embodiments described herein relate to methods for operating a content consistency service configured to monitor one or more databases of a collaboration tool for duplicate data. Once duplicated and/or similar data is detected, the content consistency service can make a determination whether to replace the detected duplicate data with a single reference data item, stored in a reference database. Thereafter, as a result of this construction, each portion of the collaboration tool that presents or otherwise serves the detected duplicate data can, instead, reference the single reference database.

For example, a content consistency service such as described herein can determine that a first web page served by a collaboration tool includes in its content a telephone number used to reach a human resources representative. The content consistency service can further determine that a second web page served by the same collaboration tool also includes in its content the same telephone number used to reach a human resources representative. In this example, the content consistency service can replace both references to the same phone number with a reference, link, or other logical association data item to an entry in a reference database. As a result of this construction, whenever next the first web page or the second web page serve their respective content, the collaboration tool can access the reference database to obtain the telephone number used to reach a human resources representative. In this manner, any changes to the telephone number used to reach the human resources representative can be made in a single location, namely, the reference database.

In particular, some embodiments described herein relate to a method for operating a content consistency service configured to maintain data integrity of content stored in a content database of a collaboration tool, the method including the operations of: receiving as a first input from the content database, a first content item (e.g., an image, a multimedia file, a string value, a date value, a physical address, or numerical value and so on) configured to be displayed by the client device in the graphical user interface; receiving as a second input from the content database of the collaboration tool, a second content item configured to be displayed by the client device in the graphical user interface; generating a reference object based on one of the first content item or the second content item; replacing the first content item in the content database with a first link to the reference object; and replacing the second content item in the content database with a second link to the reference object. In these embodiments, in response to a request from a client device communicably coupled to the collaboration tool for the first content item or the second content item, the collaboration tool can be configured to return the reference object. In some embodiments, the reference object can be stored in a reference database accessible to the collaboration tool.

In some embodiments, before generating the reference object, the above-referenced method may determine that the first content item and the second content item exhibit a similarity satisfying a threshold similarity. For example, if the first content item and the second content item are strings, the method may perform a string similarity comparison (e.g., Levenshtein distance, cosine distance, string similarity determination, and so on) to determine whether the two strings are sufficiently similar to satisfy the similarity threshold. In one embodiment, the above-referenced method may advance upon determining that two strings are greater than 90% similar, although it is appreciated that this is merely one example. In another example, if the first content item and the second content item are images, the method may perform a histogram similarity comparison (e.g., Hellinger distance, Manhattan distance, Euclidean distance, cosine similarity, and so on) to determine whether the two images are sufficiently similar to satisfy the similarity threshold.

In some cases, the above-referenced method can advance only after determining that the first content item and the second content item are similar and, additionally, that the two content items were added to the collaboration tool by the same user of that tool. Some embodiments may further include a configuration in which the reference object includes a format specifier that defines a format for displaying the reference object in the graphical user interface.

Some embodiments may include a configuration in which the reference object has an immutable data type describing data that does or should not change (e.g., an address data type, a date data type, a username or user alias data type, or a company name data type).

Some embodiments described herein relate to a method for operating a content consistency service configured to maintain data integrity of immutable content stored in a first database of a collaboration tool communicably coupled to a client device, the client device configured to receive data from the collaboration tool and to display at least a portion of the received data in a graphical user interface, the method including the operations of: receiving as a first input from the first database, a first string configured to be displayed by the client device in the graphical user interface; receiving as a second input from the database, a second string configured to be displayed by the client device in the graphical user interface; generating a first immutable object set and a second immutable object set from the first string and the second string, respectively, by parsing the respective string to extract a first set of substrings; generating a first object set from the first set of substrings by determining a respective data type for each respective extracted substring and converting the respective substring to a respective object of the determined data type; and filtering the first object set by data type to obtain a second object set with only selected immutable data types; obtaining an intersection set by intersecting the first immutable object set with the second immutable object set; generating a respective one reference object for each immutable object of the intersection set and storing each respective reference object in a second database; and replacing in the first string and in the second string at least one substring corresponding to at least one respective immutable object of the intersection set with a pointer to an associated reference object stored in the second database.

Some embodiments may include a configuration in which the set of datatypes includes one or more of a telephone number data type, a date data type, a company name data type, an email address data type, a physical address data type, a user name or user alias data type, a uniform resource locator ("URL") data type, or a uniform resource identifier ("URI") data type.

Some embodiments may include a configuration in which a modification to a selected reference object in the second database results in the first string or the second string including the modified content when displayed by the client device in the graphical user interface.

Some embodiments described herein relate to a method for operating a content consistency service to maintain data integrity of content stored in a content database of a collaboration tool, the method including operations of: accessing the content database to select similar or identical content of a selected immutable data type stored the content database; and replacing each instance of similar or identical content in the content database with a reference to a single reference object stored in a reference database.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

An example of a collaboration tool, as described herein, is a project management system or tool that can be implemented in whole or in part as software executed by a virtual or physical server or other computing appliance or combination of appliances that provides a team of individuals with a means for communicating and exchanging information with one another.

In some examples, a collaboration tool is configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs").

In other cases, a collaboration tool can be configured for non-software related purposes, such as for use by a human resources team, an information technology support group, and so on. It may be appreciated that a collaboration tool, such as described herein, can be used to exchange files, text content, or information, facilitate text, audio, or video communication, or any other suitable collaboration or communication purpose. In this manner, a collaboration tool increases efficiency of a team of individuals working on a common goal or project by increasing the speed by which information can be shared between team members, between supervisors and subordinates, and between management and staff.

In many examples, a collaboration tool, however configured or used by a team of individuals or an organization, is implemented with a client-server architecture in which a host server or service of the collaboration tool exchanges requests and responses (which may comply with a communication protocol such as HTTP, TCP, UDP, and the like), with one or more client devices, each of which may be operated by a user of the collaboration tool.

In this manner, a host server of a collaboration tool can serve information to each client device and, in response, each client device can render a graphical user interface on a display to present that information to the user of that respective client device. For example, a collaboration tool can serve an informational page for each project tracked by the collaboration tool that provides contact information for a team of individuals responsible for working on that respective project. In another example, a collaboration tool can host a page associated with a human resources department of an organization that provides a quick reference to a number of facts about that organization, such as the number or address of various offices, the names of executives, and so on.

However, as noted above, as collaboration tools are used by an organization and, in particular, as content is added to the collaboration tool over time, different sections or modules of the collaboration tool may serve unintentionally contradictory information. For example, if the example organization referenced above acquires new office space, the example human resources ("HR") page referenced above may be updated manually in a prompt manner, while an information technology ("IT") page of the same organization that serves similar information, may not. As a result, a client device submitting a request for the IT department's quick reference page may be presented with outdated information, whereas a client device submitting a request to the HR department's quick reference page may be presented with current information.

In a more simple phrasing, conventional collaboration tools that store and serve substantially immutable or otherwise unchanging data from different locations can quickly and easily become unreliable and inconsistent, especially as the collaboration tool is used by more users over a long period of time.

To account for these and other shortcomings of conventional collaboration tools, embodiments described herein include a "content consistency service" or server configured to, in many examples, provide a single source of truth (herein, a "reference database") for repeated data that is presented or served from multiple locations by the collaboration tool. As a result of this construction, any content served by a host server of a collaboration tool, such as described herein, that includes data repeated elsewhere can access the reference database to retrieve the freshest representation of that data. In this manner, content served by the collaboration tool is internally consistent and/or is presented in a consistent format.

Phrased in another, non-limiting manner, a content consistency service, such as described herein, is configured to perform, on a repeating or on-demand basis, a server-side de-duplication operation that traverses data stored by one or more databases of a collaboration tool to identify and replace duplicated or substantially similar data with a reference, link, or association to an entry in a reference database. After the content consistency service has performed this operation, the collaboration tool can access the reference database to retrieve the freshest representation of data.

In some embodiments, the content consistency service can be configured to identify data that is substantially similar to other data stored in a database of the collaboration tool. In these embodiments, the content consistency service can be configured to generate a notification or alert that can be displayed (e.g., in a graphical user interface of a client device) nearby each identified similar datum to notify a user of the collaboration tool that different data may exist in another location.

In some embodiments, the content consistency service can be configured to identify data that is substantially similar to other data stored in a database of the collaboration tool and to determine which of the identified data are correct and which of the identified data include a typographical or other error. In these examples, the content consistency service can access metadata associated with each identified similar data item in order to determine which data item should be treated as correct. Example metadata that can inform a determination of the content consistency service includes, but may not be limited to: a user who added a respective data item to the collaboration tool; a date at which a respective data item was added to the collaboration tool; and so on.

In some examples, the content consistency service can be operated or otherwise invoked each time a user begins editing or adding content to a collaboration tool. In these examples, as a user types or otherwise provides information to the collaboration tool, the content consistency service can be configured to monitor user input to determine whether any information added by the user constitutes repeated data already stored in the system. Once duplicate or similar data is identified by the content consistency service, a notification can be provided to the user to inform the user that similar or duplicate content may already exist. In some embodiments, the content consistency service can be configured to request of the user whether the user would prefer to link to existing information instead of duplicating said information.

A content consistency service, such as described herein, can be configured in a number of suitable ways. For example, in one embodiment, a content consistency service includes a data detector service configured to determine whether string data or otherwise unformatted or raw data corresponds to a known type (e.g., integer, string, array, date, and so on) or a known format (e.g., telephone number, email address, physical address, proper name, business name, username/alias, city name, state name, project name, client name, and so on). In these embodiments, the content consistency service can leverage an output of the data detector service to compare differently-formatted or differently-presented data items for similarity or identity. For example, a first page of a collaboration tool may include the string "Feb. 7, 2001" whereas a second page of the same collaboration tool may include the string "02-07-2001". In this embodiment, the data detector service can inform the content consistency service that the first page and the second page each include a string representation of the same date. In another example, a first page of a collaboration tool may include the string "ABC Company, LLC, San Francisco CA" whereas a second page of the same collaboration tool may include the string "ABC Co., San Francisco." In this embodiment, the data detector service can inform the content consistency service that the first page and the second page both reference the city "San Francisco," the organization name "ABC Company," and a corporate address.

In some embodiments, a content consistency service of a collaboration tool described herein can be configured to leverage context in which a data item is presented to determine whether that data item is similar to or duplicative of other data stored by the collaboration tool. Extending an example introduced above, a data detector service can inform a content consistency service that a first page of a collaboration tool and a second page of the same collaboration tool both reference the city "San Francisco" and the organization name "ABC Company." In this example, the content consistency service can determine that on each page a partial corporate address is shown in which an organization name precedes a city name by no more than one word. In response to this determination, the content consistency service can replace each occurrence of the identified corporate address with a reference to an entry in a reference database, such as described above.

Expanding upon the preceding example, a content consistency service, such as described herein, can be configured to leverage output of a data detector service to determine whether one or more patterns (e.g., grammatical, structural, semantic, and so on) can be identified across multiple pages of a collaboration tool. Such patterns can be used to inform a similarity or identity determination of the content consistency service.

The foregoing examples are not exhaustive of the various configurations, uses, or operations of a content consistency service such as described herein. More generally, it may be appreciated that a content consistency service, such as described herein, is any suitable combination of virtual or physical hardware or software configured to traverse, in real-time, on-demand, or otherwise, one or more databases of a collaboration tool to determine whether data stored in those databases should be merged into a single entry in a reference database. The content consistency service can be configured to parse string content, binary content, image content, multimedia content, or any other suitable content stored by the collaboration tool to determine similarity to other content. Parsing of such content may be performed using any suitable technique, and may vary from data type to data type or embodiment to embodiment (e.g., string data may be parsed in a different manner than image data). In many examples, the content consistency service can be configured to extract data and/or parse data from a larger data set or data item. For example, the content consistency service can be configured to extract one or more substrings from string data stored in a database of the collaboration tool, extract one or more sub-images from image data stored in a database of the collaboration tool, and so on.

For simplicity of description, the terms "fact," "datum," "data item," or "immutable data" are used herein to describe discrete representations of substantially static information, regardless of form or format, that can be stored by a "content" database of a collaboration tool, such as described herein. These terms can refer to entries in a content database of a collaboration tool or, in other cases, can refer to sub-portions of entries in a content database of a collaboration tool. Examples include, but are not limited to: names; dates; organization names; project names; client names; addresses; telephone numbers; email addresses; web addresses; anchor links; photographs or other multimedia files; corporate logos; corporate slogans; marketing materials; employee directory information; and so on and the like. It may be appreciated that this listing of examples is not exhaustive and may vary from industry to industry, client to client, or organization to organization. More generally, any substantially static information (e.g., information that is infrequently changed) may be considered a fact, a datum, a data item, or immutable data, such as described herein.

For example, a collaboration tool, such as described herein, can include a content database with an entry having string content: of "The ABC Corporation was founded in 1976 and has 1,056 employees worldwide." In this example, it may be appreciated that the string recites a number of data items that can be considered substantially static or otherwise immutable. For example, the date "1976" is substantially static, as is the organization name "ABC Corporation." In some examples, the employee count of 1056 may also be substantially static. In this example, a content consistency service of the collaboration tool can be configured to extract each of these three data items from the string for further processing, which can include comparison to other extracted data items extracted from other portions of the collaboration tool. In some embodiments, the content consistency service can leverage an output of a data detector service to identify and/or otherwise predict a data type associated with each extracted data item. For example, the data detector service can be configured to determine that the substring "1976" should be typed/reformatted/cast according to a definition of a date object, the substring "ABC Corporation" should be typed/reformatted/cast according to a definition of an organization name object, and the substring "1056" should be typed/reformatted/cast according to a definition of an integer, string, or double object. In some examples, the data detector service may be configured to determine that the substring "1056 employees" should be typed/reformatted/cast according to a definition of an employee count object, an organization data object, or any other suitable data object or structure.

Thereafter, the data detector service can communicate as output to the content consistency service each extracted data item as a set of objects, formatted according to a type predicted/determined by the data detector service. The content consistency service can receive this set of formatted/instantiated objects as input. Thereafter, the content consistency service can compare each of these objects to sets of other objects extracted from other string entries in the content database of the collaboration tool. In one embodiment, the content consistency service can be configured to perform a set intersection operations to determine whether two different string entries in the content database contain identical data.

In other embodiments, the content consistency service can be configured to hash or otherwise generate a comparable identifier from each of the extracted/reformatted/instantiated data objects. In these embodiments, the comparable identifier may be unique to each object or may be generic to a particular object type (e.g., a date data type, an organization name data type, a phone number data type, an address data type, and so on). It may be appreciated that the content consistency service can leverage the comparable identifier and/or hashes calculated for each object to determine similarity between objects/data items extracted from various entries of the content database of the collaboration tool.

For example, in one embodiment, an organization name object can be compared to another organization name object by the content consistency service. In one example, the organization names can be lemmatized by a semantic tagging service of the content consistency service prior to comparison of the organization names. In other cases, a string case (e.g., title case, lower case, uppercase) can be changed prior to comparison of the organization names. In still further examples, letter histograms can be created and compared to determine whether the first organization name object is sufficiently similar to the second organization name. In still further examples, a Levenshtein, cosine, or Manhattan distance can be calculated to determine string or object similarity.

In another embodiment, a first date object can be compared to a second date object by the content consistency service. In one example, the first and second date objects can be converted to an Epoch date format, or a Universal Coordinated Time object prior to comparison of the respective dates. In other cases, a time differential can be calculated to determine whether the first date is substantially similar to the second date.

In another embodiment, a first image object can be compared to a second image object by the content consistency service. For example, a first histogram of the first image object can be compared to a second histogram of the second image object to determine similarity between the two images. The histograms can be compared using any suitable comparison technique including cosine distance, Manhattan distance, and so on.

The foregoing examples are not exhaustive of the means by which a content consistency service can extract various data items or facts from a content database of a collaboration tool; it may be appreciated that, in other embodiments, other methods of comparison between other data items may be employed. Similarly, any number of suitable data types or combinations of data types (e.g., meta datatypes, such as an organization object that may include an address object, a telephone object, and so on) may be used.

In this manner, more generally and broadly, it may be appreciated that a content consistency service such as described herein is configured to access one or more content databases of a collaboration tool in order to perform one or more operations such as, and without limitation: extracting one or more facts/data items from an entry in a content database; leveraging a data detector service to determine a data type of an extracted fact; determining whether an extracted fact is specific to a project, specific to an organization, specific to an individual, or is generic; determining whether an extracted fact is formatted in a particular manner; determine whether an extracted fact is identical to another extracted fact; determine whether an extracted fact exhibits a similarity to another extracted fact (e.g., semantic analysis, string distance analysis, image histogram analysis, or another similarity analysis) that satisfies a similarity threshold; replacing an occurrence of an extracted fact in a content database with a reference to an entry in a reference database; reformatting an extracted fact in a content database according to a defined format; formatting display of an extracted fact according to an entry in a reference database; replacing an occurrence of an extracted fact in two or more content database with the same reference to the same entry in a reference database; generating a notification to a user who originally entered or last edited an extracted fact (or a page in which the extracted fact appears); generating a notification to a manager responsible for a particular project, page, or other section of a collaboration tool based on an extracted fact; generating an alert in a graphical user interface presented by a client device in communication with a host server of the collaboration tool to alert a user that potential duplicate or similar information exists in the collaboration tool; and so on and the like.

As a result of these configurations and other embodiments described herein, a content consistency service can be used to maintain data integrity and data consistency in a collaboration tool. In particular, a content consistency service can be leveraged by a collaboration tool to ensure that no data that is substantially static is formatted in an inconsistent manner or presented in an inconsistent manner to different users of the same collaboration tool. In other words, a content consistency service can, without limitation: provide improved trademark use consistency; provide a consistent user experience; ease data freshness and maintenance burden and expense; and so on.

Some content consistency services can be operated on an automatic, scheduled, or triggered basis. Some content consistency services can be operated manually. Some content consistency services can be operated when a user endeavors to edit or add content to a collaboration tool. Some content consistency services include a data detector service, although this may not be required of all embodiments. Some content consistency services leverage output from one or more artificial intelligence algorithms to determine similarity between extracted facts.

These foregoing and other embodiments are discussed below with reference to FIGS. 1-5. However, those skilled in the art will readily appreciate that the detailed description given herein with respect to these figures is for explanatory purposes only and should not be construed as limiting.

Figure 1:
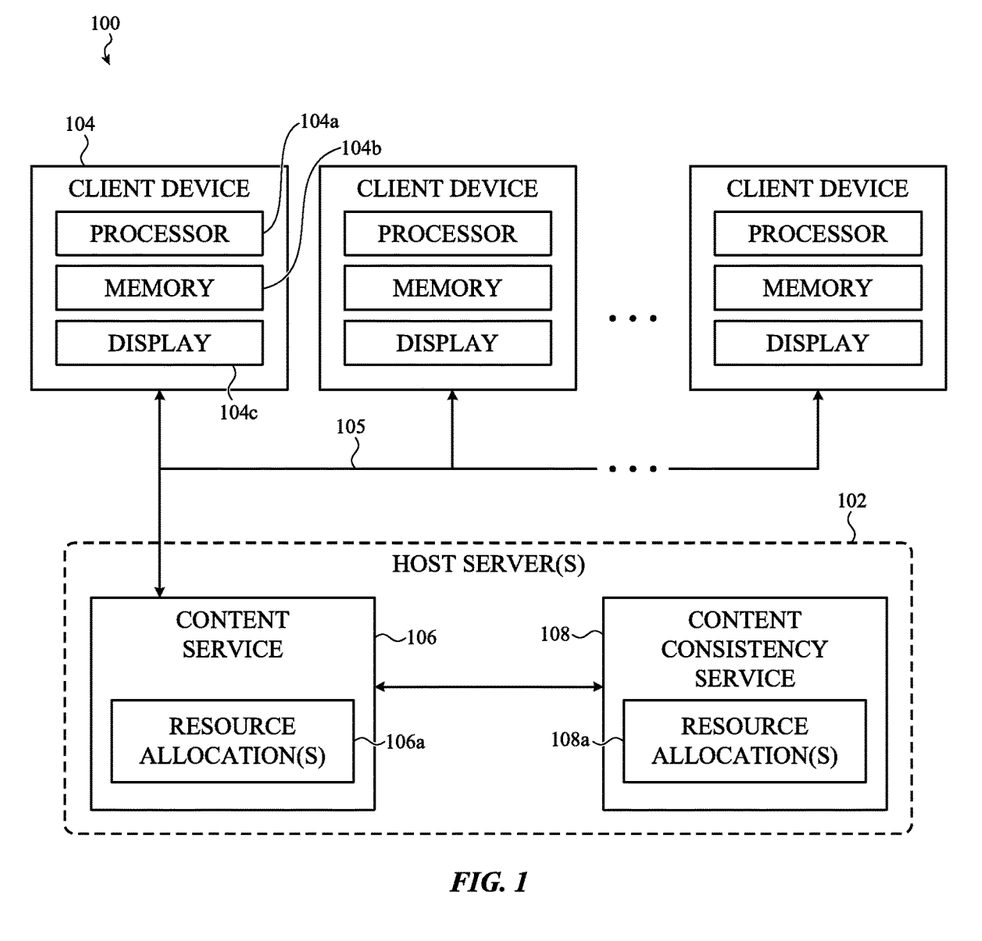
FIG. 1 is a schematic representation of a collaboration tool including a content consistency service, such as described herein.

FIG. 1 is a schematic representation of a portion of an example collaboration tool, such as described herein. In the illustrated embodiment, the collaboration tool 100 is implemented with a client-server architecture including a host server 102 that communicably couples (e.g., via one or more networking or wired or wireless communication protocols) to one or more client devices, one of which is identified as the client device 104.

It may be appreciated that other client devices may be configured in a substantially similar manner as the client device 104, although this may not be required of all embodiments and different client devices can be configured differently and/or may transact data or information with, and/or provide input(s) to, the host server 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the host server 102 and to securely transact information or data with, and provide input(s) to, the host server 102. In some embodiments, the client application may be a browser application configured to access a web page or service hosted by the host server 102 that is accessible to the client device 104 over a private or public network that may, in some embodiments, include the open internet.

In many embodiments, the host server 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host server 102 can include a number of discrete subservices or purpose-configured modules, containers, or virtual machines each configured to perform, coordinate, serve, or otherwise provide one or more services, functions, or operations of the host server 102, such as the operations of (1) serving content of the collaboration tool 100 from a database of the collaboration tool 100 to one or more client devices communicably coupled to the host server 102, (2) traversing one or more of those databases to identify similar or identical data items that may be duplicated and could be replaced with references to a single object or data item stored in a reference database, and (3) performing data type conversion and analysis operations on unformatted data.

As noted above, the host server 102 of the collaboration tool 100 can be configured, at least in part, to extract and/or analyze content stored by the system in order to find and extract similar or identical discrete, and substantially static, data items. For example, the host server 102 can be configured to, without limitation: perform a topic modeling operation on extracted data items; determine semantic similarity between extracted data items; determine grammatical similarity between extracted data items; determine sentiment similarity between extracted data items; determine metadata similarity between extracted data items which can include content creators, content editors, projects or project relationships, creation dates, edit dates, number of users interacting with the content, seniority of users interacting the content, and so on; and so on.

It may be appreciated that the foregoing examples are not exhaustive of the means of comparing two bodies of text or other data to one another to determine similarity therebetween. Other examples or natural language processing algorithms, pipelines, or techniques can be used as well in place of those examples presented above. Examples of other natural language processing algorithms or techniques that can be leveraged to determine a similarity between two bodies of text or other textual data can include but may not be limited to: cosine similarity; Levenshtein distance; Hamming distance; trigram calculations; Jaro-Winkler calculations; Sorensen-Dice calculations; stemming; lemmatization; tokenization; topic modeling; latent Dirichlet allocation; normalization; Jaccard similarity scoring; Ratcliff-Obershelp similarity calculations; and the like. It may be appreciated that any suitable method or means of determining similarity data items stored by the host server 102 of the collaboration tool 100 can be used.

In other examples, other data types (e.g., not string-based) can be compared in another manner. For example, numerical data types (e.g., integer, double, float, date) can be compared with numerical comparison techniques. In another example, multimedia data types can be compared by comparing metadata and/or by comparing via histogram analysis or another suitable comparison technique.

For simplicity of description, many embodiments that follow reference string data items extracted from string or string-based entries in a database of the collaboration tool 100 (e.g., the host server 102) and compared to one another using a suitable string comparison or string similarity technique.

Embodiments described herein can configure a host server (e.g., the host server 102) in a number of suitable ways. In one embodiment, depicted in FIG. 1 the host server 102 of the collaboration tool 100 can include a content service 106 and a content consistency service 108. In these embodiments, the content service 106 can include one or more databases (e.g., content databases) that store content that may be configured to be displayed on a display of a client device, such as the display 104c of the client device 104. The content stored in the content database of the content service 106 can be any suitable content associated with any suitable feature or function of the collaboration tool 100 and/or the host server 102.

In many embodiments, the content service 106 is configured to host a communication interface, such as an Application Programming Interface ("API") that may be accessed by one or more components or modules of the host server 102 and/or one or more remote devices, such as the client device 104. The API hosted by the content service 106 can gate or otherwise control access to content stored in the database(s) of the content service 106. For example, the content service 106 may respond only to authenticated queries. In other cases, the content service 106 may provide database input sanitization operations.

As with other embodiments described herein, the content consistency service 108 of the host server 102 of the collaboration tool 100 can be configured in a number of suitable ways to, among other operations, query the content service 106 in order to extract data items that may be duplicative. More specifically, the content consistency service 108 can be configured to regularly, automatically, in response to a trigger, or manually traverse one or more content databases of the content service 106.

When traversing a content database, the content consistency service 108 may be configured to submit a query to the content service 106 (and/or directly to a content database of the content service 106) in order to obtain string content therefrom.

Thereafter, the content consistency service 108 can receive the string content as input and can perform a number of operations in order to determine whether the string content contains any data item that is comparable to other data items extracted previously from content of the content database (or another content database). The other data items previously extracted from other content of the content database (or another content database) can be stored in a data structure in a memory available to the content consistency service 108 or, in other cases, such data items can be stored in a database of the content consistency service 108, such as a reference database.

Once a data item has been extracted by the content consistency service 108 from the string content retrieved from a content database of the content service 106, the content consistency service 108 can be configured to compare that data item to previously-obtained data items. As noted with respect to other embodiments described here, this comparison can be a direct identity comparison that will fail unless the two data items include identical string content. In other cases, the content consistency service 108 can be configured to determine whether the string content(s) of the extracted data items are sufficiently similar (e.g., beyond a threshold) to make a determination that the two data items refer to the same substantially static information.

For example, in one embodiment, the content consistency service 108 includes or is otherwise coupled to a data detector service configured to select a data type from a set of predefined data types based on an extracted data item. The data type selected by the data detector service can be based on a best guess based on a string format of the data item. Example data types that can be selected by a data detector service, such as described herein, include but may not be limited to: a date data type; a string name data type; an organization name data type; an organization address data type; a telephone number data type; a physical address data type; an internet address data type; a URL data type; and so on and the like.

Once the data detector service determines a most-likely data type for a given extracted data item, the data detector service can recast/retype/instantiate the extracted data item as the selected type. For example, a string data item, "555-111-2222" which can be identified by the data detector service as a telephone number, can be recast as a telephone number data object.

In these embodiments, the data detector service can return to the content consistency service 108 an instantiated object having a specific data type and populated with data that corresponds to the extracted data item. The content consistency service 108 can receive the instantiated object as input and can compare that object to other objects of the same type previously received from the data detector service.

For example, as noted above, the content consistency service 108 can be configured to segment the string content into substrings, and type/recast extracted substrings by leveraging the data detector service. The division operation, in which the string input is subdivided/segmented into substrings, can be performed in a number of suitable ways. For example, in some cases, the content consistency service 108 can include a natural language processing service configured to linguistically tag and/or lemmatize each word or phrase in the string content. In these examples, the content consistency service 108 may receive as input from the natural language processing service a set of noun phrase objects which, in turn, can be compared to previously obtained noun phrase objects to determine if duplicate data is identifiable.

A person of skill in the art may readily appreciate that any suitable method may be used to subdivide string content into one or more data items, such as described herein. Similarly, it may be appreciated that any suitable method may be used to compare extracted data items to previously-extracted data items to determine whether any similar or duplicate data exists. As noted above, a similarity determination may be made by comparing a result of a similarity operation (e.g., Levenshtein distance, cosine distance, and so on) with a selected threshold. For example, in one embodiment, the content consistency service 108 may be configured to determine that two data items are "similar" if the string content of those data items is 80% similar. In other cases, other similarity thresholds may be selected; the preceding example is not exhaustive.

In other embodiments, as noted above, the data items can be hashed or otherwise used to generate an identifier unique to a particular data item. In these embodiments, the content consistency service 108 can be configured to compare unique identifiers to determine whether duplicate or similar content exists in one or more content databases of the content service 106.

As such, regardless of the method by which data items are extracted from existing content in one or more content databases of the content service 106, and regardless of the method or methods by which the content consistency service 108 determines that at least two data items are sufficiently similar, the content consistency service 108 can advance to take action based on the determination that duplicate/similar data is present in the content database of the content service 106. For example, the content consistency service 108 may determine that a first database entry stored in a content database of the content service 106 includes the substring "Apple Computer," which can be recast as an organization name object, and that a second database entry stored in the same or a different content database of the content server 106 includes the substring "APPLE INC.," which also can be recast as an organization name object, recite substantially duplicate data. Once this determination is made, the content consistency service 108 can, without limitation: generate a notification to a particular user that duplicate content (namely, two separate references to the same company) is present; replace all instances of each substring with a single reference to a shared, common object stored as an entry in a reference database of the content consistency service 108; reformat each instance of each substring according to a selected format (e.g., reformatting each substring to read "Apple Inc."); generate a duplicate data warning to any user that operates a client device (e.g., client device 104) to request access to the host server 102 and/or to request content from the content service 106 that requires the content service 106 to access one of the first database entry or the second database entry; and so on. It may be appreciated that these foregoing examples are not exhaustive of the operations that may be taken by a content consistency service, such as the content consistency service 108, in response to a determination that substantially similar and/or identical content is stored in at least one content database of the content service 106.

As such, for simplicity of description, the embodiments that follow reference an example configuration in which a content consistency service, such as the content consistency service 108, is configured to replace each occurrence of an extracted data item with a reference, callback, template, association, or other link to an entry in a reference database available to the content consistency service 108. In other words, any time the host server 102 and/or the content service 106 receives a request to display content that includes such a reference, the content service 106 can query the reference database to obtain a string to display in place of the link.

For example, in one embodiment, string content stored in a content database may include the string, "Company ABC worked closely with Apple Computer on this project." In this example, the content consistency service 108 may determine that the substring "Apple Computer," when typed by the data detector service as an organization name, is identical to other references to the company stored elsewhere in the content database. In response to this determination, the content consistency service 108 may instruct the content service 106 (or another suitable module) to replace each or a specific occurrence of the substring "Apple Computer" with a placeholder text referencing an entry in a reference database. After replacing the substring, the string content stored in the content database may include the string, "Company ABC worked closely with {{Company3.name}} on this project." Correspondingly, the reference database is updated by the content consistency service 108 to include an entry (which may be an object, string, or other data structure) that associates the identifier "Company3" with the company Apple Inc. In this manner, and as a result of this construction, at a later time when the string content is requested by a client device for display, the content service 106 can translate the identifier "Company3" into an object by accessing the reference database. Thereafter, the content service 106 can access an attribute of that object, namely the "name" attribute, for display on the client device. In this manner, each time the string content is requested (e.g., by a client device), the substring "Apple Inc." can be displayed using a form and/or format defined by the object stored in the reference database. In other words, any changes made to the Company3 object in the reference database will be automatically reflected every time the string content is displayed on a client device.

As noted above, a content consistency service can perform its various operations in response to a variety of triggers. For example, in some embodiments, a content consistency service can be configured to detect duplicate or similar content, such as described above, in response to data input provided by a user of a collaboration tool (e.g., the collaboration tool 100) via a client device, such as the client device 104. For example, the content consistency service can be configured to receive user input as input in real time, and may generate, in response to the user input, one or more alerts or notifications to inform the user that the user may be entering duplicate content.

In other examples, a content consistency service can be configured to perform one or more operations (such as described above) on a scheduled bases or automatically in response to receiving an indication from a content service and/or a content database that new information is stored in the content database. In these examples, the content consistency service can be configured to receive as input a delta dataset of new information stored in the content database or, alternatively, the content consistency service can be configured to traverse all or a portion of the content database again.

In other examples, a content consistency service can be leveraged to determine one or more typographical errors in content stored in a content database. For example, the content consistency service may be able to determine that a first content item is similar to a second content item, but not similar enough to satisfy a similarity threshold. In these examples, the content consistency service can be configured to determine a difference between the first data item and the second data item. In response, the content consistency service can generate a notification to one or more users of the collaboration tool that potentially duplicate data exists, but at least one location of that data contains a typographical error.

It may be appreciated that the foregoing examples are not exhaustive. More generally and broadly, it is appreciated that the collaboration tool 100 and in particular the content consistency service 108 of the collaboration tool 100 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical relationships in content stored in one or more content databases and served by a content service, such as the content service 106.

Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaboration tool 100 of FIG. 1 can be implemented in a number of suitable ways. As illustrated, the host server 102 includes one or more purpose-configured modules or components each configured to perform a discrete task associated with the operation of the collaboration tool 100.

In particular, as noted above, the host server 102 includes a notification server, a content consistency service 108, and a content service 106. It may be appreciated that although these functional elements are identified as separate and distinct "servers" that each includes allocations of physical or virtual resources (identified in the figure as the resource allocations 106a and 108a respectively)—such as one or more processors, memory, and/or communication modules (e.g., network connections and the like)—that such an implementation is not required. More generally, it may be appreciated that the various functions described herein of a host server 102 can be performed by any suitable physical hardware, virtual machine, containerized machine, or any combination thereof.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2A:
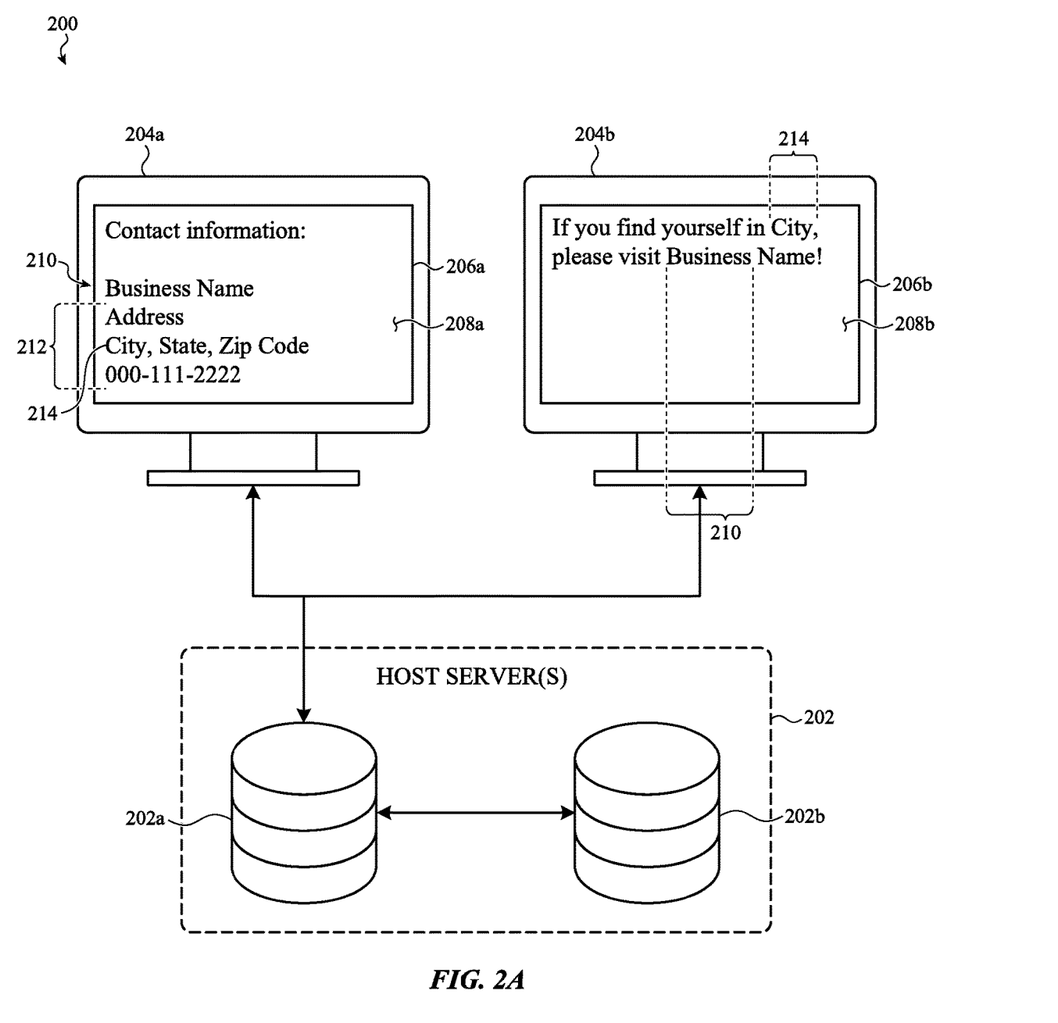
FIG. 2A depicts an example user interface that may be associated with a collaboration tool including a content consistency service, such as described herein.

FIG. 2A depicts an example user interface that may be associated with a collaboration tool including a content consistency service, such as described herein.

The collaboration tool 200 includes a host server 202 that, in turn, includes a content database 202a and a reference database 202b. In this example, as with others described herein, the content database 202a can be monitored by a content consistency service such that any duplicate information or substantially similar data items referring to substantially static information can be replaced with references, links, or some other token that refers to an entry in the reference database 202b.

For example, in the depicted embodiment, the host server 202 is communicably coupled to two separate client devices. A first client device is identified as the client device 204a and a second client device is identified as the client device 204b.

In this example, the client device 204a requests a first page from the host server 202. In response, the host server 202 queries the content database 202a to retrieve content to be displayed on the client device 204a and, in particular, content to be shown on a display 206a of the client device 204a via a graphical user interface 208a rendered by the client device. In this example, the first page can include multiple data items that can be extracted by a content consistency service, such as described herein. Three examples are provided, and are labeled as the business name 210, the business address 212, and a city 214. In this specific example, the business address 212 includes the city 214, but this may not be required of all embodiments. Any one of these elements may be stored in the reference database 202b, such as described above. More specifically, a string content stored in the content database 202a may be "{{Business0.name}} {{Business0.address}}."

The client device 204b requests a second page from the host server 202, different from the first page. In response, the host server 202 queries the content database 202a to retrieve content to be displayed on the client device 204b and, in particular, content to be shown on a display 206b via a graphical user interface 208a. In this example, string content retrieved from the content database 202a in response to the second request may also include the business name and the city 214. More specifically, the string content stored in the content database 202a may be "If you find yourself in {{Business0.city}} }, please visit {{Business0.name}}."

As a result of these constructions, if an address of the business changes in the reference database 202b, that change will be automatically propagated to every page displayable by the host server 202, including the first page requested by the client device 204a and the second page requested by the client device 204b.

Figure 2B:
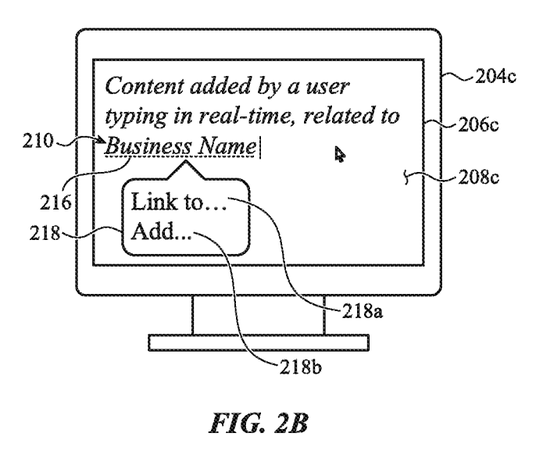
FIG. 2B depicts another example user interface that may be associated with a collaboration tool including a content consistency service, such as described herein.

In still further examples, a content consistency service such as described herein can be leveraged in real-time to assist a user of a client device while that user is entering content to the collaboration tool. For example, as shown in FIG. 2B, a client device 204c that includes a display 206c configured to a render a graphical user interface 208a that facilitates user input and, in particular, user input of data or information to be saved to one or more databases of the collaboration tool. In the illustrated embodiment, a user a text field facilitating text-based input by a user can receive input from a user of the client device 204. In this example, the content consistency service, or another module, virtual or actual machine, or combination thereof (whether implemented or executed in whole or in part on the client device 204c or a remote server, such as the host server 202 depicted in FIG. 2A) can be leveraged to monitor the text input provided to the graphical user interface 208a by the user in real time. The content consistency service in this embodiment can be configured to detect or predict (using any suitable method or combination of methods including, but not limited to: semantic analysis; lemmatization; tokenization; neural network processing; and so on) a likelihood that the user is entering, or is intended to enter, a string that references a data item stored or otherwise tracked by the content consistency service. Continuing the example of FIG. 2A, in FIG. 2B, the content consistency service determines beyond a threshold confidence that the user intends to enter a business name 210 that corresponds to a data item or object tracked by the content consistency service.

While the user enters the business name as raw text, the system can determine via any suitable analysis a similarity metric between the content entered by the user and content stored and/or tracked by the content consistency service and, once the similarity metric exceeds or otherwise satisfies a threshold (which can vary, may be fixed, or may be stored in a settings file or calculated in real-time), the system can instruct the graphical user interface 208c to visually emphasize for the user that the system has recognized that the user is entering a data item tracked by said system.

In the illustrated embodiment, the system instructs the graphical user interface 208c to underline the business name 210 to highlight for the user of the client device 204c that business name 210 is associated with or sufficiently similar to a data item tracked by the content consistency service. In addition or in the alternative, the system can instruct the graphical user interface 208c to generate a notification, popup, slide-over, or other window that presents one or more options to the user of the client device 204c. For example, in the illustrated embodiment, the graphical user interface 208c generates a popup 218 that presents two different options to the user as it relates to the business name 210. In particular, the popup 218 allows the user to automatically link the business name 210 with a data item stored or tracked by the content consistency service (depicted as the option 218a). In addition, the popup 218 allows the user to identify the business name 210 (or, more specifically, the string content entered by the user) as being data that should be tracked by the content consistency service (depicted as the option 218b).

In still further examples, a content consistency service, such as described herein can be configured to provide a data validation interface (such as shown in FIG. 2B) to a user engaged in entering data into a shared database. More specifically, a data validation interface can be shown to the user to confirm whether: (1) the information being entered by the user is related to, or is identical to, information already tracked by the content consistency service; (2) the information being entered by the user should be replaced with information being tracked by the content consistency service (e.g., the user-entered information is similar to, but not identical to existing data, such as by typographical error); (3) whether information entered by the user should replace information being tracked by the system; (4) whether information or data stored in another location, but not yet stored or tracked by the content consistency service, is equivalent to—and should be replaced by—the data or information being tracked by the user.

For example, if a user enters information including Business Name 1, the data validation interface may display a question such as "Is Business Name 1 the same as Business Name 2?" and may also present input interface elements enabling the user to confirm or deny that Business Name 1 is identical to Business Name 2. In these examples, the content consistency service can serve to correct typographical errors of a user in real time. In other cases, the content consistency service in this example can serve to automatically replace content entered by a user with a reference to a common data object, such as described herein.

The foregoing example embodiments and graphical user interfaces are presented as examples only. In other cases, other graphical user interfaces and/or other functions of a graphical user interface can be leveraged to provide output to a user, to receive input from a user, and/or to identify to a user that a data item is being tracked by the content consistency service and/or could be tracked by the content consistency service. More generally and broadly, it may be appreciated that the embodiments described herein reference a system that is configured to detect redundantly-captured or stored data that is substantially immutable (e.g., business names, addresses, phone numbers, and so on) and to replace occurrences of that data with references to a single object stored in a database controlled by or otherwise accessible to a content consistency service, such as described herein. In this manner, staleness of data in a database, especially a shared database, can be substantially and automatically reduced.

Figure 3:
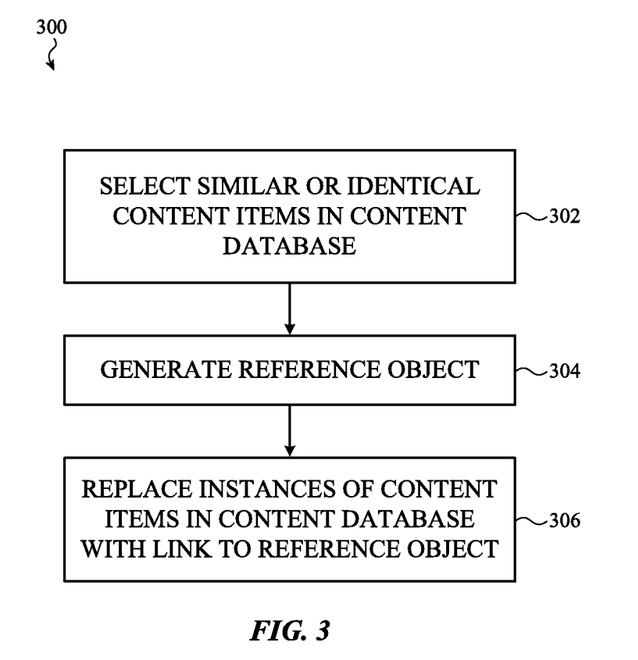
FIG. 3 is a flow chart that depicts example operations of a method of operating a content consistency service, such as described herein.
Figure 4:
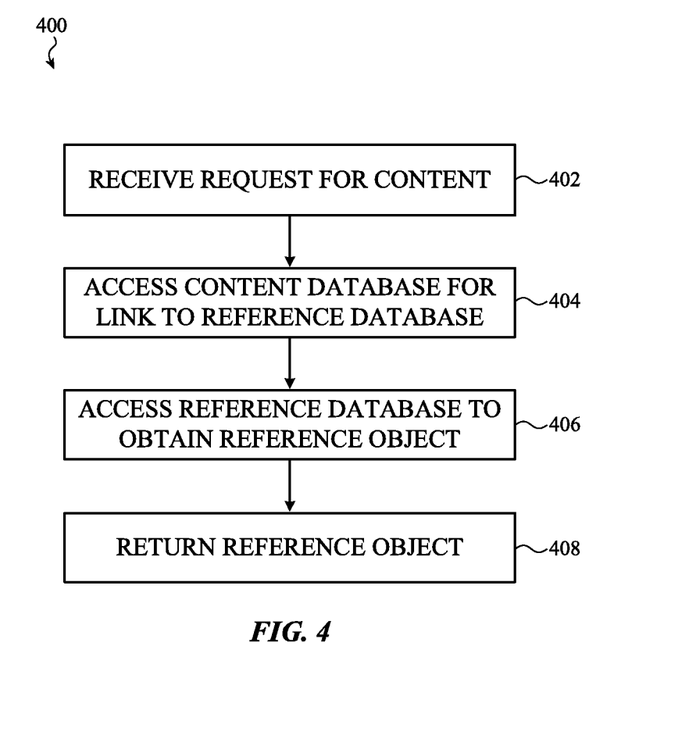
FIG. 4 is a flow chart that depicts example operations of another method of operating a content consistency service, such as described herein.
Figure 5:
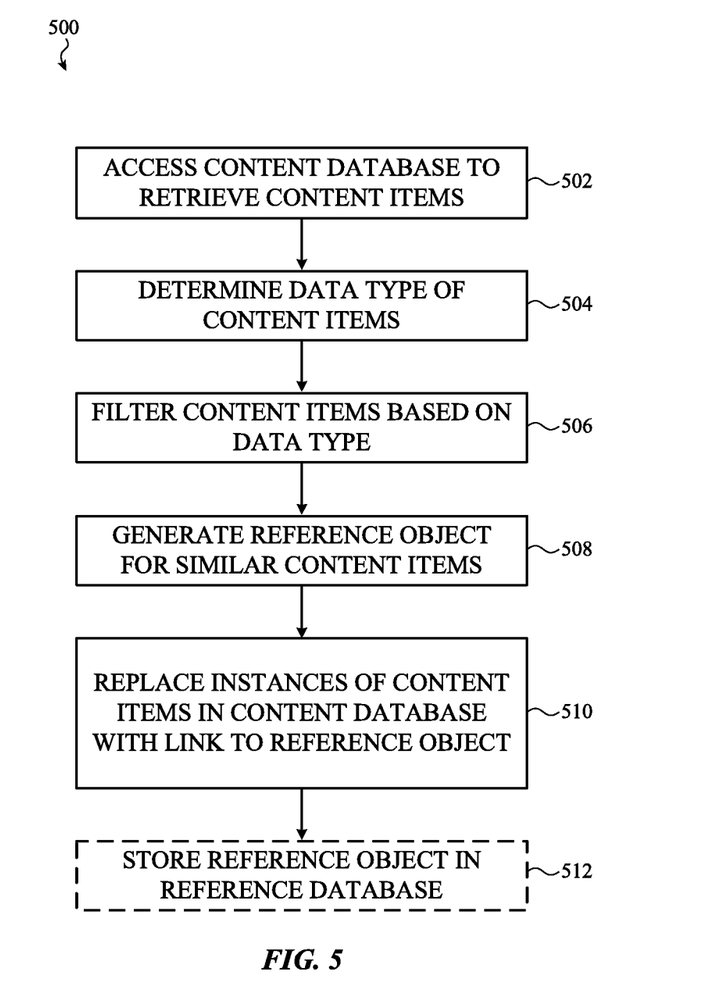
FIG. 5 is a flow chart that depicts example operations of another method of operating a content consistency service, such as described herein.

Generally and broadly, FIGS. 3-5 depict flow charts of example operations of example methods of operating a content consistency service, such as described herein. It may be appreciated that these simplified examples are not exhaustive and, in some cases, additional or alternative operations or operation order can be used.

FIG. 3 is a flow chart that depicts example operations of a method of operating a content consistency service, such as described herein. As noted with respect to other embodiments described herein, this method can be performed in a number of suitable ways. However, in many examples, the method 300 is performed, in whole or in part, by a content consistency service, such as described herein.

The method 300 includes operation 302 in which similar or identical content items can be selected from a database. The method 300 further includes operation 304 at which a reference object is generated. The method 300 further includes operation 306 at which instances of the content items extracted/selected from the database at operation 302 can be replaced with a link to the reference object.

For example, the method 300 can be leveraged by and/or performed in whole or in part by a system such as described herein to detect and/or suggest changes to software documentation. For example, a collaboration tool such as described herein can be configured for use by a team of software developers to store and generate documentation describing the function or operation of one or more application programming interfaces associated with a software product or service. In this embodiment, a content consistency service such as described herein can leverage the method 300 to replace all occurrences of a particular class name, object name, method name, or variable name in the documentation with references to a single database. as a result of this configuration, when a member of the software development team changes a name of a class, method, variable, or other item in the software itself, the content consistency service can update any associated reference objects. From an end-user perspective, all documentation describing the software product is automatically updated to refer to the new class name, the new method name, the new variable name, and so on. As a result of the method 300, software documentation maintenance time can be substantially reduced.

In another example, the method 300 can be leveraged by and/or performed in whole or in part by a system such as described herein to track and update employee names, titles, roles, or responsibilities across a human resources page or portal hosted by, or drawing information from, a collaboration tool such as described herein. In this example, once an individual employee's name (e.g., marriage) or job responsibilities are changed by an authorized individual, the updated information can be automatically propagated throughout the entire organization's various collaboration tools or databases.

FIG. 4 is a flow chart that depicts example operations of another method of operating a content consistency service, such as described herein. As with the method 300 described above, the method 400 can be performed by a content consistency service, such as described herein. This description is not repeated.

The method 400 includes operation 402 at which a request is issued for content. The request can be issued to a content database, such as described herein. Next, at operation 404, the method 400 advances to access the content database to retrieve the requested content which can, in many examples, include a link to a reference database. Next at operation 406, the method 400 can advance to access the reference database to obtain the reference object. Finally at operation 408, the reference object can be returned, optionally along with content obtained from the content database, to be displayed alongside the content obtained from the content database.

Similar to the method 300, the method 400 can be leveraged and/or performed in whole or in part to facilitate real-time display of information such as, but not limited to: employee names; employee titles; employee roles; project names; software product names; software product features; business names; bibliographic data; location data; and so on. In general, it may be appreciated that any suitable data can be accessed, served, or otherwise displayed via method 400.

FIG. 5 is a flow chart that depicts example operations of another method of operating a content consistency service, such as described herein. As with the method 300 described above, the method 500 can be performed by a content consistency service, such as described herein. This description is not repeated.

The method 500 includes operation 502 at which a content database is accessed in order to retrieve one or more content items. Next, at operation 504, a data type of each data item can be determined (e.g., via a data detector service, such as described above). Next, at operation 506, the content consistency service can filter the content items retrieved at operation 502 based on datatype determined at operation 504. Next, at operation 508, a reference object can be generated for each determined set of data items that are similar or identical to one another. Next, at operation 510, each instance of each data/content item determined to be similar to other content items is replaced with a link to the reference object. Finally, optionally, at operation 512, the reference object can be stored in a reference database.

The method 500 is not exhaustive of the steps or operations that may be required or preferred to detect and replace static data with a reference to a single object stored in or otherwise accessible to a content consistency service, such as described herein. For example, although method 500 and other examples embodiments described herein reference text content, it may be appreciated that text content is not the only content that can be captured and stored by a system such as described herein. Other data types (see, e.g., method operation 504) that can be tracked by a system such as described herein include, but are not limited to: images; audio files; multimedia files; external links; internal links; project pages; dates; numbers; and so on.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for operating a content consistency service configured to maintain data integrity of content stored in a content database of a collaboration tool, the method comprising:
   receiving as a first input from the content database of the collaboration tool, a first content item configured to be displayed by a client device in a graphical user interface;
   receiving as a second input from the content database of the collaboration tool, a second content item configured to be displayed by the client device in the graphical user interface;
   detecting a first data type of the first content item and a second type of the second content item;
   in accordance with the first data type of first content item corresponding to the second data type of the second content item, generating a reference object based on one of the first content item or the second content item;
   replacing the first content item in the content database with a first link to the reference object; and
   replacing the second content item in the content database with a second link to the reference object; wherein in response to a request from the client device communicably coupled to the collaboration tool for the first content item or the second content item, the collaboration tool is configured to return the reference object.

2. The method of claim 1, further comprising storing the reference object in a reference database after generating the reference object.

3. The method of claim 2, wherein in response to the request from the client device for the first content item or the second content item, the collaboration tool is configured to return the reference object by accessing the reference database.

4. The method of claim 2, wherein in response to the request from the client device for the first content item or the second content item, the collaboration tool is configured to return the reference object by accessing a respective link stored in the content database to the reference object stored in the reference database.

5. The method of claim 1, wherein the first content item comprises:
an image;
a multimedia file;
a string value;
a date value;
a physical address; or
a numerical value.

6. The method of claim 1, further comprising, before generating the reference object, determining that the first content item and the second content item exhibit a similarity satisfying a threshold similarity.

7. The method of claim 6, wherein determining that the first content item and the second content item exhibit the similarity satisfying the threshold similarity is performed in response to a determination that at least one of the first content item or the second content item were added to the content database by a specified user of the collaboration tool.

8. The method of claim 6, wherein:
the first content item is a first string value;
the second content item is a second string value; and
determining the similarity between the first content item and the second content item comprises determining one or more of:
a string similarity between the first string value and the second string value;
a Levenshtein distance between the first string value and the second string value;
a cosine similarity between the first string value and the second string value;
a lemmatization of the first string value or the second string value; or
a tokenization or grammatical tagging of the first string value or the second string value.

9. The method of claim 6, wherein:
the first content item is a first image;
the second content item is a second image; and
determining the similarity between the first content item and the second content item comprises determining one or more of:
a Hellinger distance between histograms of the first image and the second image;
a Manhattan distance between histograms of the first image and the second image;
a Euclidean distance between histograms of the first image and the second image; or
a cosine similarity between histograms of the first image and the second image.

10. The method of claim 1, wherein the reference object comprises a format specifier that defines a format for displaying the reference object in the graphical user interface.

11. The method of claim 1, wherein the reference object has an immutable data type.

12. The method of claim 11, wherein the immutable data type is one of:
an address data type;
a date data type;
a username or user alias data type; or
a company name data type.

13. A system for operating a content consistency service configured to maintain data integrity of content stored in a content database of a collaboration tool, the system comprising:
one or more servers hosting the content consistency service, a server of the one or more servers comprising:
one or more processing units; and
a non-transient computer-readable storage medium storing a set of instructions which, when executed by the one or more processing units, cause the one or more processing units to:
receive a first input from the content database of the collaboration tool, a first content item configured to be displayed by a client device in a graphical user interface thereof;
receive a second input from the content database of the collaboration tool, a second content item configured to be displayed by the client device in the graphical user interface;
detect a first data type of the first content item and a second type of the second content item;
in accordance with the first data type of first content item corresponding to the second data type of the second content item, generate a reference object based on one of the first content item or the second content item;
replace the first content item in the content database with a first link to the reference object; and
replace the second content item in the content database with a second link to the reference object, wherein in response to a request from the client device for the first content item or the second content item, the collaboration tool is configured to return the reference object.

14. The system of claim 13, wherein the first content item comprises:
an image;
a multimedia file;
a string value;
a date value;
a physical address; or
a numerical value.

15. The system of claim 13, wherein the set of instructions, when executed, further cause the one or more processing units to determine that the first content item and the second content item exhibit a similarity satisfying a threshold similarity, before generating the reference object.

16. The system of claim 15, wherein the set of instructions, when executed, determines that the first content item and the second content item exhibit the similarity satisfying the threshold similarity, in response to a determination that at least one of the first content item or the second content item were added to the content database by a specified user of the collaboration tool.

17. The system of claim 15, wherein:
the first content item is a first string value;
the second content item is a second string value; and
determining the similarity between the first content item and the second content item comprises determining one or more of:
a string similarity between the first string value and the second string value;
a Levenshtein distance between the first string value and the second string value;
a cosine similarity between the first string value and the second string value;
a lemmatization of the first string value or the second string value; or
a tokenization or grammatical tagging of the first string value or the second string value.

18. The system of claim 15, wherein:
the first content item is a first image;
the second content item is a second image; and
determining the similarity between the first content item and the second content item comprises determining one or more of:
- a Hellinger distance between histograms of the first image and the second image;
- a Manhattan distance between histograms of the first image and the second image;
- a Euclidean distance between histograms of the first image and the second image; or
- a cosine similarity between histograms of the first image and the second image.

19. The system of claim 13, wherein the reference object comprises a format specifier that defines a format for displaying the reference object in the graphical user interface.

20. The system of claim 13, wherein the reference object has an immutable data type, the immutable data type being one of:
- an address data type;
- a date data type;
- a username or user alias data type; or
- a company name data type.

\* \* \* \* \*